UNITED STATES PATENT OFFICE.

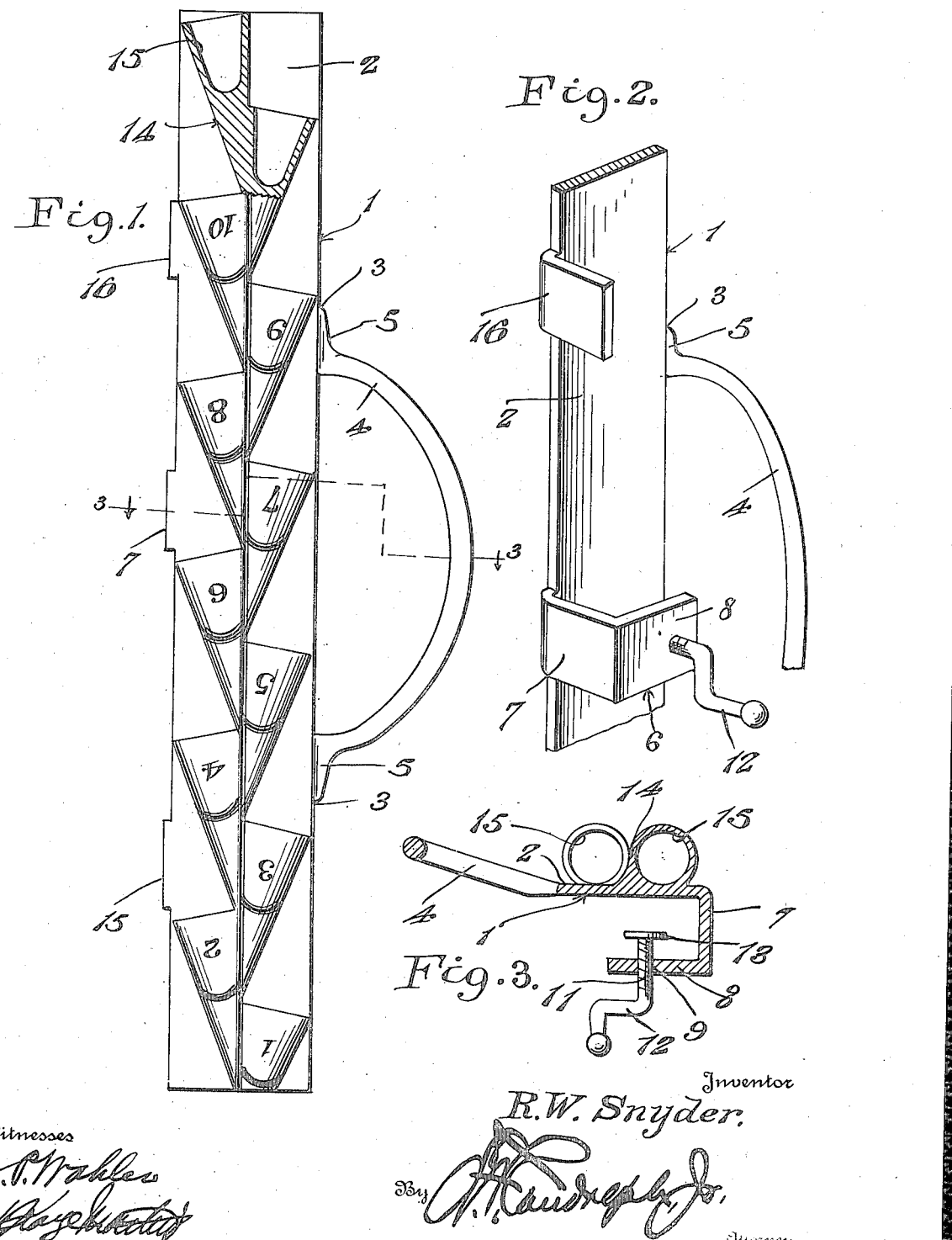

ROBERT W. SNYDER, OF BIGHEART, OKLAHOMA.

GAGE.

1,188,017.

Specification of Letters Patent.

Patented June 20, 1916.

Application filed March 17, 1915. Serial No. 15,034.

*To all whom it may concern:*

Be it known that I, ROBERT W. SNYDER, a citizen of the United States, residing at Bigheart, in the county of Osage and State of Oklahoma, have invented certain new and useful Improvements in Gages; and I do hereby declare the following to be a full, clear, and exact description of the invention, such as will enable others skilled in the art to which it appertains to make and use the same.

This invention relates to new and useful improvements in gages, and more particularly to that class of gages known as oil thieves, which are particularly designed for use in testing the amount of sediment or residue in the bottoms of oil tanks before the contents of the tanks is turned into the pipe line. The sediment is generally known as B. S., and it is important that this sediment should not be high enough in the bottom of the tank to reach the pipe line connection, and my invention has for its principal object to provide a gage or testing device which will enable the user to easily and quickly determine the depth of the sediment within the tank.

Another object of the invention is to provide a device which may be easily and quickly attached or detached to or from a pole in order that the device may be lowered into a tank when in use.

A further object of the invention is to provide a device having a plurality of receptacles which are positioned at predetermined points along a support so that the height of the sediment within the tanks may be easily gaged.

As shown in the drawing, the receptacles are placed so that there are twelve on the support and these are supposed to be one inch apart, thereby making the entire length of the central support twelve inches so that a tester knowing the length of the gage as well as the distance between the receptacles may easily determine the quantity of sediment in the bottom of the tank which is being tested.

The above objects are accomplished by the device, a full and complete description of which will appear in the following description and accompanying drawings, in which, Figure 1 is a face view of a gage constructed in accordance with this invention. Fig. 2 is a fragmentary perspective view of Fig. 1, and Fig. 3 is a transverse sectional view taken on line 3—3 of Fig. 1.

Referring to the drawings by characters of reference, the numeral 1 designates as an entirety the device, which comprises a standard 2, which is formed of a single sheet of metal. Formed integral with the standard 2 intermediate its ends as at 3 is a suitable handle 4 which is U-shaped and has the ends of its arms reinforced at the point where it joins the standard as at 5.

A suitable clamp designated generally by the numeral 6 comprising the arm 7 having formed at one edge the flange 8 which is formed with the threaded aperture 9, is formed on the standard intermediate the upper and lower extremities of the gripping portion of the handle, and extending through the threaded aperture 9 is a suitable threaded stem 11 which is formed at its outer end with the crank arm or handle 12 and carries at its inner end a suitable washer 13 which is pivotally mounted thereon and designed to engage the pole or other support on which the device is secured. Formed near each end of the standard and extending rearwardly therefrom so as to coöperate with the clamp are the arms 16 which prevent displacement of the device when in position on a pole.

Secured to the front face of the standard 1 at evenly spaced intervals, which may be a suitable distance apart, are the cups or receptacles 14 which are formed with recesses 15 for the reception of the material which is being tested so that the height of residue or sediment within the tanks may be determined by noting which of the receptacles contains the matter and which do not contain the matter. These receptacles or cups are preferably spaced from each other a distance equal to one inch so that the height of matter within the tank may be readily readable. Each of the cups is inscribed with inverted numerals so that the number of inches of sediment within the tank may be easily determined.

It will be apparent from the foregoing that in use the device is clamped on to a pole or other suitable handle and then lowered into the tank or other oil containing receptacle. The same is then removed from the tank and the location of the sediment with relation to the receptacles is noted as the receptacles will retain a quantity of the sediment and hold the same during its upward passage so that the height of the sediment in the bottom of the tank may be easily seen.

While in the foregoing there has been shown and described the preferred embodiment of this invention, it is to be understood that such changes may be made in the combination and arrangement of parts as will fall within the spirit and scope of the invention as claimed.

What is claimed is:

A gage comprising a flat elongated standard, a plurality of relatively spaced cone shaped cups formed on one side of the standard and arranged in a pair of vertically extending rows, the cups of one of the rows being arranged in staggered relation to the cups of the other row to provide the open ends of the cups in one row adjacent the bottoms of the cups in the other row, the cups of each row extending upwardly and outwardly from the vertical center of the standard and provided with the open ends inclined downwardly from the vertical center of the standard to receive a portion of residue within a tank.

In testimony whereof I affix my signature in presence of two witnesses.

ROBERT W. SNYDER.

Witnesses:
Tom Hamm,
C. P. Pinney.